United States Patent
Wang et al.

(10) Patent No.: US 12,449,311 B2
(45) Date of Patent: Oct. 21, 2025

(54) OPTICAL PROBE WITH HIGH STABILITY FOR MEASUREMENT OF RADIATION INFORMATION OF TURBINE DISKS

(71) Applicant: University of Electronic Science and Technology of China, Sichuan (CN)

(72) Inventors: Chao Wang, Sichuan (CN); Jing Jiang, Sichuan (CN); Yi Niu, Sichuan (CN); Hongzu Li, Sichuan (CN); Zezhan Zhang, Sichuan (CN); Lihao Yang, Sichuan (CN); Peifeng Yu, Sichuan (CN); Shan Gao, Sichuan (CN)

(73) Assignee: Universityof Electronic Science and Technology of China, Sichuan (CN)

( * ) Notice: Subject to any disclaimer, the term of this patent is extended or adjusted under 35 U.S.C. 154(b) by 843 days.

(21) Appl. No.: 17/735,102

(22) Filed: May 2, 2022

(65) Prior Publication Data
US 2022/0260423 A1 Aug. 18, 2022

(30) Foreign Application Priority Data
Aug. 10, 2021 (CN) .......................... 202110913744.2

(51) Int. Cl.
*G01J 5/00* (2022.01)
*G01J 5/08* (2022.01)
*G01J 5/0806* (2022.01)
*G01J 5/0821* (2022.01)
*G01J 5/0875* (2022.01)

(52) U.S. Cl.
CPC ........... *G01J 5/0088* (2013.01); *G01J 5/0806* (2013.01); *G01J 5/0821* (2013.01); *G01J 5/0875* (2013.01); *G01J 5/08* (2013.01)

(58) Field of Classification Search
CPC ...... G01J 5/0088; G01J 5/0806; G01J 5/0821; G01J 5/0875; G01J 5/08; G01K 11/32; G01K 1/00; G01K 1/08; G01K 1/14
See application file for complete search history.

(56) References Cited

U.S. PATENT DOCUMENTS 4,919,505 A * 4/1990 Bartosiak .................. G01J 5/08
374/161

FOREIGN PATENT DOCUMENTS

DE 102013103520 B4 * 7/2022 ............. G01N 21/33

* cited by examiner

*Primary Examiner* — John E Breene
*Assistant Examiner* — Janice M Soto

(57) ABSTRACT

An optical probe with high stability for measurement of radiation information of a turbine disk of an aeroengine includes a one-piece outer casing, a pressing ring, a sapphire window piece, an inner spacer, an outer spacer, a lens, first fixing nuts, second fixing nuts, fixing ropes and fixing screws. The one-piece outer casing is made from GH3044 solid solution strengthened nickel-based antioxidant alloy. An interior of the probe is divided into eight parts, which are as follows from a proximal hot end to a right end of the probe in sequence: a pressing ring chamber, a cold air vent, a sapphire window piece chamber, an outer spacer fixing chamber, a lens chamber, a beam chamber, a beam focusing chamber, and an optical fiber chamber.

2 Claims, 2 Drawing Sheets

OPTICAL PROBE WITH HIGH STABILITY FOR MEASUREMENT OF RADIATION INFORMATION OF TURBINE DISKS

CROSS REFERENCE OF RELATED APPLICATION

The present invention claims priority under 35 U.S.C. 119(a-d) to CN 202110913744.2, filed Aug. 10, 2021.

BACKGROUND OF THE PRESENT INVENTION

Field of Invention

The present invention relates to the field of aeroengine radiation temperature measurement, and more particularly to an optical probe with high stability for the measurement of radiation information on a surface of a turbine disk.

Description of Related Arts

As a core component of an aircraft, an aeroengine has always been a research hotspot of scholars at home and abroad. The progress of aviation technology is inseparable from the aeroengine. Due to high precision and complexity, the aeroengine is called "the jewel in the crown of modern industry". The core component of the aeroengine is a turbine disk. The turbine disk is the hot end core component of the aeroengine for fixing turbine blades, and then using the blades to obtain energy from the gas, so as to drive the fan, the compressor and the engine to rotate at high speed through the shaft. Due to the extremely high rotational speed (often reaching 10000 rpm-20000 rpm) while working, the turbine disk is very high in surface temperature, reaching 800° C., which often causes damage to the turbine disk, and in severe cases, damages the engine and even leads to a flight accident. Therefore, it is necessary to measure the temperature of the turbine disk.

There are two temperature measurement methods, namely, contact temperature measurement method and noncontact temperature measurement method. The contact temperature measurement method includes steps of fixing a temperature sensor on a surface of an object by welding, and reaching a thermal equilibrium state after the temperature sensor is in sufficient contact with the object for a certain period of time, wherein a temperature reflected by the temperature sensor at the thermal equilibrium state is a measured temperature, the temperature sensor is preferably the thermal resistor and thermocouple. This method has small error and simple equipment, and is easy to be realized in applications. However, the contact temperature measurement method will cause irreversible changes in the surface state of the object and destroy the temperature field distribution of the object, resulting in poor dynamics and poor portability. The basic principle of the noncontact temperature measurement method is that the thermal radiation of the object changes with the temperature, so the temperature of the object is solved according to the radiation. Instead of directly contacting with the object to be tested, the noncontact temperature measurement method collects and measures the thermal radiation emitted by the object, and inversely deduces the temperature of the object based on law of thermal radiation. According to different principles, the noncontact temperature measurement method includes acoustic temperature measurement method, radiation temperature measurement method, spectroscopic temperature measurement method and laser interference temperature measurement method.

The radiation temperature measurement method, which is based on the law of thermal radiation, includes steps of converting radiation into electrical signals through a photon detector, and then calculating a target temperature. The radiation temperature measurement method does not damage the temperature field distribution of the measured object, has a fast response speed and a wide temperature measurement range. It is very suitable for temperature measurement under complex conditions such as high temperature, high-speed movement or rotation, and strong corrosion. Since the measured object is not directly contacted in the radiation temperature measurement method, the physical properties of the measured object are not affected. It is able to be seen that radiation temperature measurement method is very suitable for the devices that have been in high temperature environment for a long time, such as turbine disks. Therefore, the present invention proposes a highly stable micro acquisition probe for radiation temperature measurement of a turbine disk, which is able to withstand high temperature, high pressure and high vibration of the engine, and has strong stability and air tightness due to the design of one-piece outer casing and double-sided fixation.

SUMMARY OF THE PRESENT INVENTION

Aiming at deficiencies of the prior art, the present invention provides an optical probe for the measurement of radiation information of a turbine disk of an aeroengine, wherein the optical probe has high stability, small size, high temperature and high pressure resistance, and high air tightness.

Accordingly, the present invention provides technical solutions as follows.

An optical probe with high stability for measurement of radiation information of a turbine disk of an aeroengine comprises an one-piece outer casing, first fixing nuts and second fixing nuts, wherein a nut-shaped structure is provided on the one-piece outer casing for dividing the one-piece outer casing into an optical fiber fixing part and a housing fixing part, both the optical fiber fixing part and the housing fixing part have external threads and respectively engaged with the second fixing nuts and the first fixing nuts; the optical fiber fixing part has an optical fiber chamber for accommodating optical fibers; the housing fixing part has a beam chamber, a lens chamber, an outer spacer fixing chamber, a window piece chamber and a pressing ring chamber from the optical fiber chamber in sequence all of which are communicated with each other; the beam chamber is communicated with the optical fiber chamber through a beam focusing chamber; a lens is provided within the lens chamber, an inner spacer is provided on an inner wall between the lens and the beam chamber, an outer spacer is provided within the outer spacer fixing chamber, a window piece is provided within the window piece chamber, a pressing ring is provided within the pressing ring chamber; each of the first fixing nuts and the nut-shaped structure has two through holes which are not in contact with other structures of the one-piece outer casing; when the probe is fixed on an aeroengine, four fixing ropes respectively penetrate through the through holes, and two ends of each of the fixing ropes are fixed to the aeroengine.

Preferably, two cold air vents are provided at two ends of a side wall of the pressing ring chamber respectively, so that cold air flows into the pressing ring chamber from one of the two cold air vents, and then flow out of the pressing ring chamber through another of the two cold air vents, thereby achieving cooling.

Preferably, the window piece is a sapphire window piece with a thickness of 3 mm and is coated with a layer of an antireflective film with a thickness in a range of 1.5-2.3 μm; the one-piece outer casing, the first fixing nuts for and the second fixing nuts are all made from GH3044 solid solution strengthened nickel-based antioxidant alloy; a diameter of a thread of the housing fixing part is 12 mm; a diameter of each of the cold air vents is 2 mm; the pressing ring chamber has a diameter of 9.4 mm and a thickness of 2.5 mm; the outer spacer fixing chamber has a diameter of 9.4 mm and a thickness of 1.7 mm; the lens chamber has a diameter of 9 mm and a thickness of 9 mm; the beam chamber has a diameter of 7 mm and a thickness of 10 mm; the beam focusing chamber has a diameter of 1.2 mm and a thickness of 1 mm; the optical fiber chamber has a diameter of 3.2 mm and a thickness of 9.8 mm.

Compared with the prior art, the present invention has advantages as follows. Compared with traditional probes, the one-piece outer casing makes it possible to control the influence of the external environment on the internal structure only by controlling the pressing ring, which effectively ensures air tightness (for gas). At the same time, the steel wire ropes penetrate through the nuts for ensuring the installation stability, expansion holes are reserved for the sapphire window piece at the proximal hot end, and the cold air vents are provided to ensure the stability of the internal structure, so as to further adapted to the high temperature and high pressure environment of the turbine disk. Spacer nuts are able to be flexibly customized to prevent fiber locking caused by high temperature.

Figure 1:
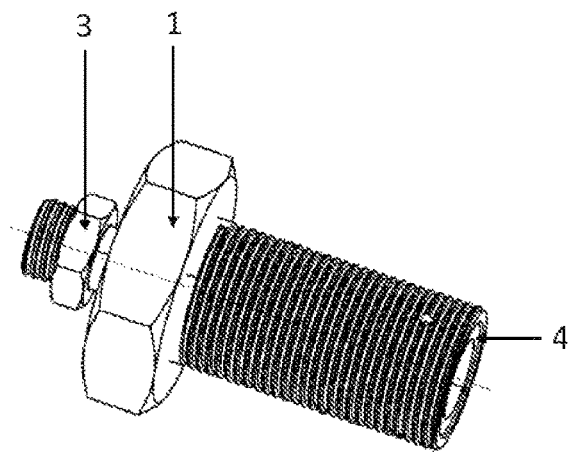
FIG. 1 shows an optical probe with high stability for measurement of radiation information on a surface of a turbine disk provided by the present invention.

In the drawings, 1: one-piece outer casing; 2: first fixing nut; 3: second fixing nut; 4: pressing ring; 5: cold air vent; 6: sapphire window piece; 7: outer spacer; 8: lens; 9: inner spacer; 10: fixing hole; 11: fixing rope; 12: fixing screw; 13: optical fiber (with interfaces); 14: turbine disk; 15: fixing plate; 16: beam; 17: pressing ring chamber; 18: sapphire window piece chamber; 19: outer spacer fixing chamber; 20: lens chamber; 21: beam chamber; 22: beam focusing chamber; 23: optical fiber chamber.

DETAILED DESCRIPTION OF THE PREFERRED EMBODIMENT

An optical probe for the measurement of radiation information of a turbine disk of an aeroengine provided by the present invention is made from GH3044 superalloy. While collecting real-time optical signals, firstly two high-temperature resistant steel wire ropes pass through two fixing holes of the probe respectively, and then another two high-temperature resistant steel wire ropes pass through nuts which are made from GH3044 superalloy, two ends of each of the four high-temperature resistant steel wire ropes are provided with the nuts. A collection board has a first threaded hole (for installing the probe) and eight second threaded holes (for installing the nuts). The probe is screwed into the collection board through the first threaded hole, a first fixing nut is screwed into a proximal hot end of the collection board, the four high-temperature resistant steel wire ropes are installed on the collection board through screws respectively, so that an acquisition device with high stability is obtained. A rear end of the acquisition device is connected with an optical fiber and then the acquisition device with the optical fiber is put on a turbine disk for information acquisition. While information acquisition, determine whether it is necessary to add flowing cold air according to the actual situation.

The present invention is further explained in detail with accompanying drawings as follows.

Figure 2A:
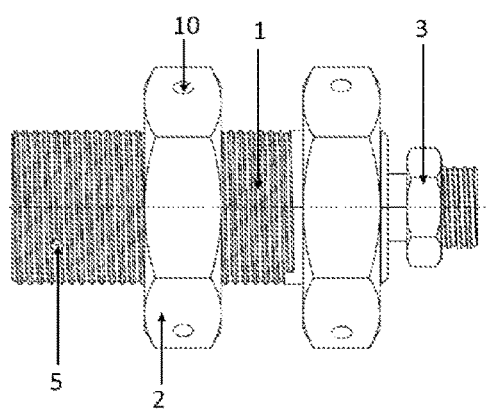
FIG. 2A is a structural view of the probe provided by the present invention.
Figure 2B:
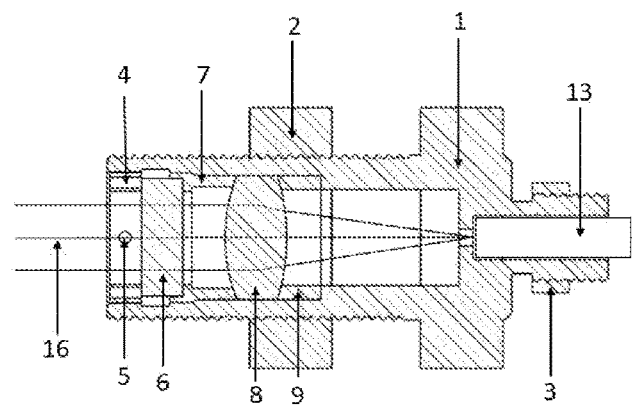
FIG. 2B is a sectional view of the probe provided by the present invention.

FIG. 1 shows an optical probe for the measurement of radiation information of a turbine disk of an aeroengine provided by the present invention. FIG. 2 is a structural diagram of the probe. According to the present invention, a one-piece outer casing 1, first fixing nuts 2, second fixing nuts 3, a pressing ring 4, an outer spacer 7, an inner spacer 9, fixing ropes 11, fixing screws 12 are all made from GH3044 high-temperature resistant superalloy which has high plasticity, moderate thermal strength, excellent oxidation resistance, good stamping and welding process performance.

A sapphire window piece 6 has a thickness of 3 mm and is coated with a layer of an antireflective film with a thickness in a range of 1.5-2.3 μm for reducing reflected light and increasing light transmittance. A lens 8 is made from infrared fused quartz, which has higher working and melting temperature to be adapted to high temperature and high pressure environment of the turbine disk compared with traditional glass.

Figure 3:
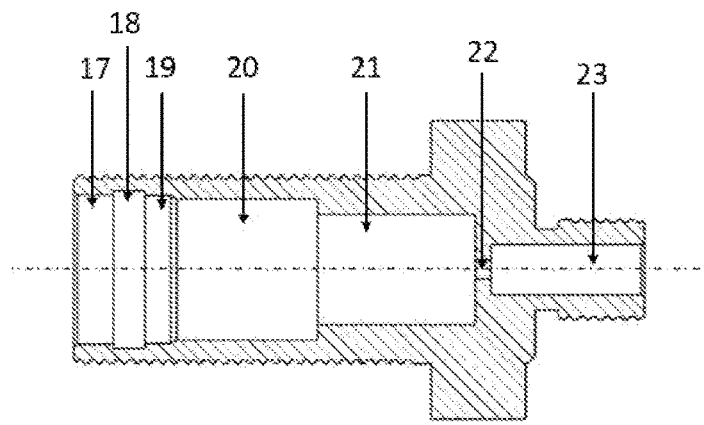
FIG. 3 is a sectional view of a one-piece outer casing of the probe provided by the present invention.

FIG. 3 is a sectional view of the one-piece outer casing of the probe provided by the present invention. A diameter of a thread of a proximal hot end of the probe is 12 mm. A diameter of a cold air vent 5 is 2 mm through which cold air is able to come in and out. A pressing ring chamber 17 for fixing a pressing ring has a diameter of 9.4 mm, and a thickness of 2.5 mm. A sapphire window piece chamber 18 for fixing the sapphire window piece and reserving an expansion position for a proximal hot end of the sapphire window piece has a diameter of 10 mm and a thickness of 2 mm. An outer spacer fixing chamber 19 for fixing an outer spacer and a part of a lens has a diameter of 9.4 mm and a thickness of 1.7 mm. A lens chamber 20 for fixing the lens and an inner spacer has a diameter of 9 mm and a thickness of 9 mm. A beam chamber 21 has a diameter of 7 mm and a thickness of 10 mm. The thickness of the beam chamber 21 for focusing the light in a beam focusing chamber 22 is able to be changed according to different focal lengths of the lens. The beam focusing chamber 22 has a diameter of 1.2 mm and a thickness of 1 mm. An optical fiber chamber 23 for fixing an optical fiber has a diameter of 3.2 mm and a thickness of 9.8 mm.

The probe comprises a pressing ring, a sapphire window piece, spacers, a lens, a spacer nut and a one-piece outer casing, wherein a layer of high-temperature resistant sealant is applied between the pressing ring and the sapphire window piece for providing good air tightness in extreme environments, the sapphire window piece has a thickness of 3 mm, a layer of an antireflective film with a thickness in a range of 1.5-2.3 μm is coated on the sapphire window piece for reducing reflected light and increasing light transmission, the lens is made from fused silica which has better heat resistance. Except for the sapphire window piece and the lens, other components are made from GH3044 solid solution strengthened nickel-based antioxidant alloy which has good plasticity and thermal strength, excellent oxidation resistance, better stamping and welding process performance. The size of the spacer nut is able to be changed according to actual working conditions, and when the optical fiber is connected with an optical fiber interface integrated on the outer casing, the optical fiber and the optical fiber interface are prevented from being locked due to severe temperature changes, thereby affecting the acquisition effect. The outer casing is made from GH3044 superalloy which is easy to be manufactured. A hex nut is provided on the outer casing, which avoids the nut loosening caused by vibration to a certain extent when the probe is installed on the turbine disk. The nut loosening will cause the components to be unstable and cause inaccurate acquisition of signals. Moreover, the hex nut has two through holes with a diameter of 2 mm for cooperating with an external nut which also has two through holes with a diameter of 2 mm; four steel wire ropes respectively pass through the two through holes of the hex nut and the two through holes of the external nut, and then are positioned by four screws outside the probe, so as to further enhance the anti-vibration performance of the probe. An interior of the probe is divided into eight parts, which are as follows from the proximal hot end to a right end in sequence:

(1) a pressing ring chamber for installing the pressing ring;
(2) a cold air vent through which cold air is able to come in and out;
(3) a sapphire window piece chamber reserved for thermal expansion of the proximal hot end of the sapphire window piece;
(4) an outer spacer fixing chamber for installing the outer spacer and fixing the sapphire window piece;
(5) a lens chamber for installing the outer spacer, the lens and the pressing ring;
(6) a beam chamber for allowing beam to pass through, which is able to be customized according to a focal length of a lens;
(7) a beam focusing chamber for transmitting the collected beam signal to the fiber at the focal point; and
(8) an optical fiber chamber.

Due to threaded holes and high-temperature sealant, the proximal hot end of the entire outer casing has high tightness for preventing the high-temperature gas from entering the outer casing and damaging the lens inside the outer casing. At the same time, due to the integrated design of the outer casing, the influence of the external environment on the internal structure is able to be controlled only by the external pressing ring. A sapphire window piece chamber is reserved at the proximal hot end of the sapphire window piece to prevent the sapphire window piece from thermal expansion and resulting in collapse. There is a cold air vent at the proximal hot end of the probe to prevent damage to the components caused by the high temperature inside the probe.

Combined with FIGS. 2 and 3, a method of assembling the probe comprises steps of:
(A1) installing the inner spacer 9 into the lens chamber 20, wherein the size of the inner spacer is customized according to the size of the lens, the lens chamber 20 is defined by a straight non-threaded port;
(A2) installing the lens 8 into the lens chamber 20, wherein the lens is able to be selected according to a required optical path;
(A3) installing the outer spacer 7 into the lens chamber 20 and the outer spacer fixing chamber 19, wherein the size of the outer spacer is customized according to the size of the lens, the outer spacer fixing chamber 19 is defined by a straight non-threaded port;
(A4) installing the sapphire window piece 6 into the sapphire window piece chamber 18; and
(A5) screwing the pressure ring 4 into the pressure ring chamber 17 through the threaded hole, and at the same time, coating a layer of high-temperature resistant sealant resistant to 1200° C. between the pressure ring and the sapphire window piece for enhancing the air tightness.

Figure 4:
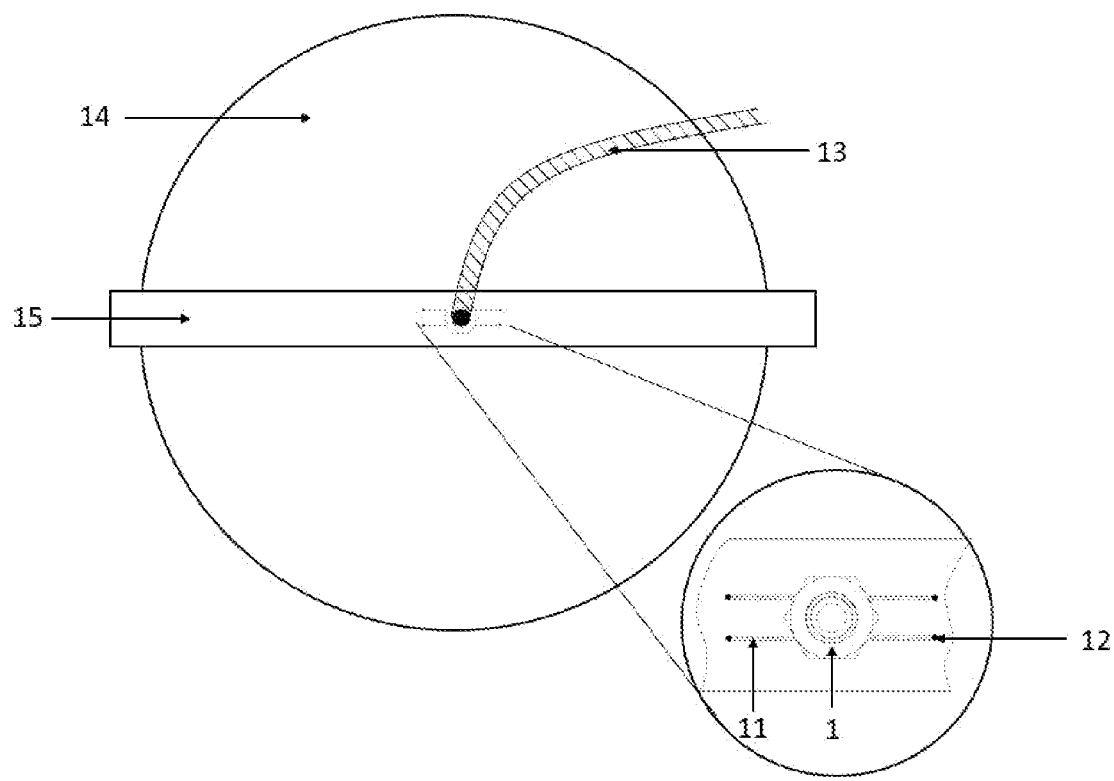
FIG. 4 shows the probe is installed on a turbine disk.
Figure 5:
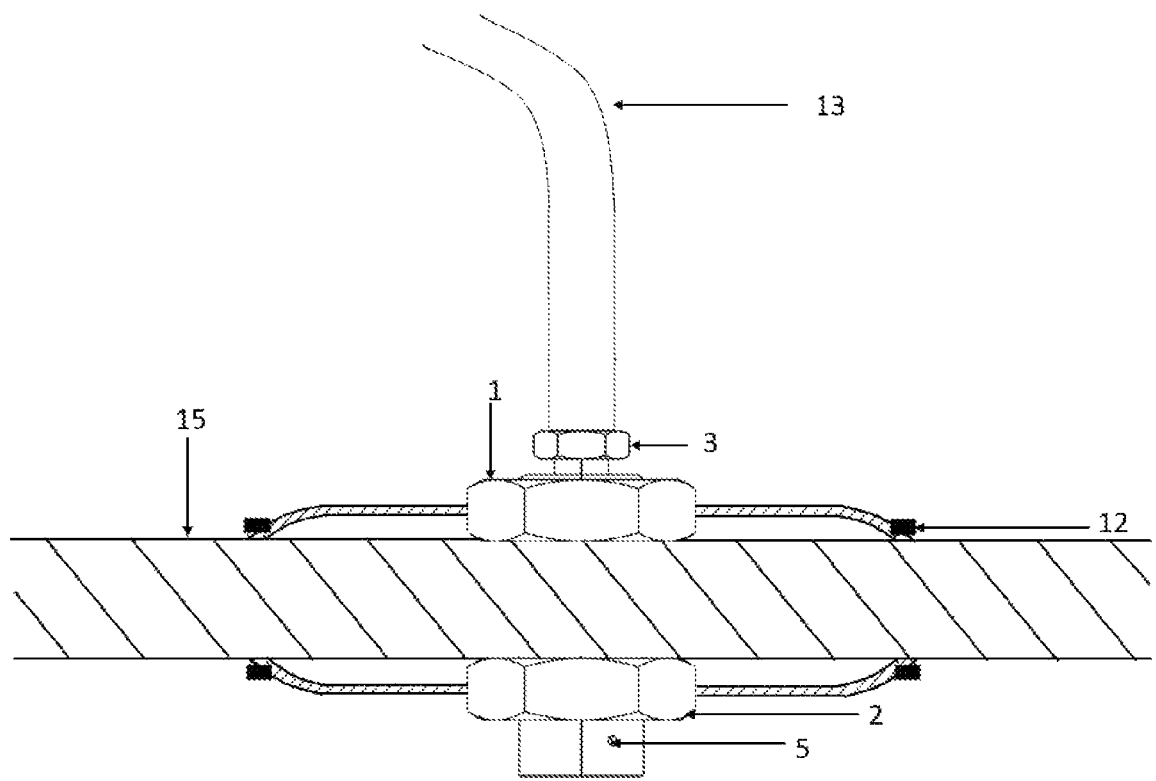
FIG. 5 is a detail diagram of the probe is installed on the turbine disk.

FIGS. 4 and 5 show the probe is installed on the turbine disk, wherein FIG. 4 is a top view and FIG. 5 is a left side view. Combined with FIGS. 4 and 5, a method of installing the probe on the turbine disk comprises steps of:
(B1) inserting the four fixing ropes 11 into the one-piece outer casing 1 and the first fixing nuts 2 through the four fixing holes 10, screwing the fixing screws 12 at both ends of each of the four fixing ropes 11 respectively;
(B2) screwing the probe into the first threaded hole of the fixing plate 15 from one side thereof, and at the same time fixing the probe through screwing the first fixing nuts 2 into the outer casing;
(B3) screwing the eight fixing screws 12 into the fixing plate 15 through the second threaded holes respectively for enhancing the stability of the probe; and
(B4) inserting the optical fiber 13 into the optical fiber chamber 23 and installing the fixing plate to the turbine disk 14 for information acquisition.

According to the above embodiment, the dimensions of each part of the probe are not intended to limit the present invention. The curvature of the lens and the dimensions and specifications of other parts are able to be changed according to the actual working environment of the turbine disk of different aero-engines, and the material of the high-temperature alloy and the lens is able to be changed according to the actual situation. Any modification, equivalent replacement, modification, etc. made within the spirit and principle of the present invention shall be included within the protection scope of the present invention.

What is claimed is:
1. An optical probe with high stability for measurement of radiation information of a turbine disk of an aeroengine, comprises a one-piece outer casing, a pressing ring, a sapphire window piece, an inner spacer, an outer spacer, a lens, first fixing nuts, second fixing nuts, fixing ropes and fixing screws, wherein:
the one-piece outer casing is made from GH3044 solid solution strengthened nickel-based antioxidant alloy;
an interior of the probe is divided into eight parts, which are as follows from a proximal hot end to a right end of the probe in sequence:
a pressing ring chamber for installing the pressing ring;
a cold air vent through which cold air is able to come in and out;
a sapphire window piece chamber reserved for thermal expansion of the proximal hot end of the sapphire window piece;
an outer spacer fixing chamber for installing the outer spacer and fixing the sapphire window piece;

a lens chamber for installing the outer spacer, the lens and the pressing ring;

a beam chamber for allowing beam to pass through, which is able to be customized according to a focal length of a lens;

a beam focusing chamber for transmitting the collected beam signal to the fiber at the focal point; and an optical fiber chamber, wherein due to threaded holes and high-temperature sealant, the proximal hot end of the outer casing has high tightness for preventing high-temperature gas from entering the outer casing and damaging the lens inside the outer casing; at the same time, due to an integrated design of the outer casing, an influence of external environment on an internal structure is able to be controlled only by an external pressing ring; the sapphire window piece chamber is reserved at the proximal hot end of the sapphire window piece to prevent the sapphire window piece from thermal expansion and resulting in collapse; the cold air vent at the proximal hot end is able to prevent damage to components caused by high temperature inside the probe;

the first fixing nuts, the second fixing nuts, the pressing ring, the outer spacer, the inner spacer, the fixing ropes, and the fixing screws are all made from GH3044 high-temperature resistant superalloy which has high plasticity, moderate thermal strength, excellent oxidation resistance, good stamping and welding process performance;

the sapphire window piece is coated with a layer of an antireflective film with a thickness in a range of 1.5-2.3 μm for increasing light transmittance; the lens is made from infrared fused quartz, which has higher working and melting temperature to be adapted to high temperature and high pressure environment of the turbine disk compared with traditional glass; a size of the spacer nut is able to be changed according to actual working conditions, and when the optical fiber is connected with an optical fiber interface integrated on the outer casing, the optical fiber and the optical fiber interface are prevented from being locked due to severe temperature changes, thereby affecting the acquisition effect.

2. The optical probe according to claim 1, wherein lenses of different sizes and focal lengths are able to be selected according to different application environments; the pressing ring, the outer spacer, the inner spacer and the sapphire window piece are able to be changed according to lens specifications; the one-piece outer casing is able to be changed according to a focal length of the lens and a size of internal components to be adapted to different working environments.

* * * * *